May 24, 1966 N. S. WOOLDRIDGE 3,252,491
PRODUCE PROCESSING APPARATUS
Filed Oct. 29, 1963 7 Sheets-Sheet 1
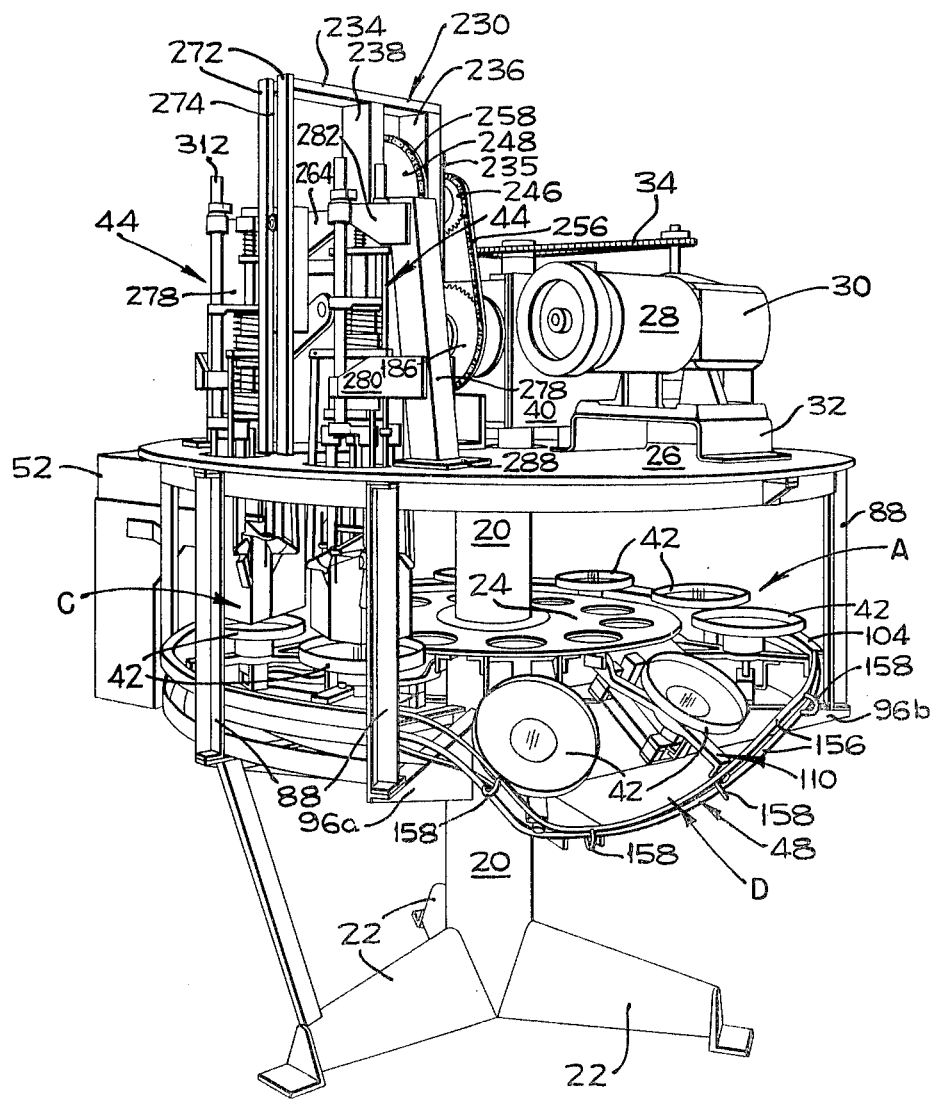
FIG_1
INVENTOR
NORMAN S. WOOLDRIDGE
BY
ATTORNEY

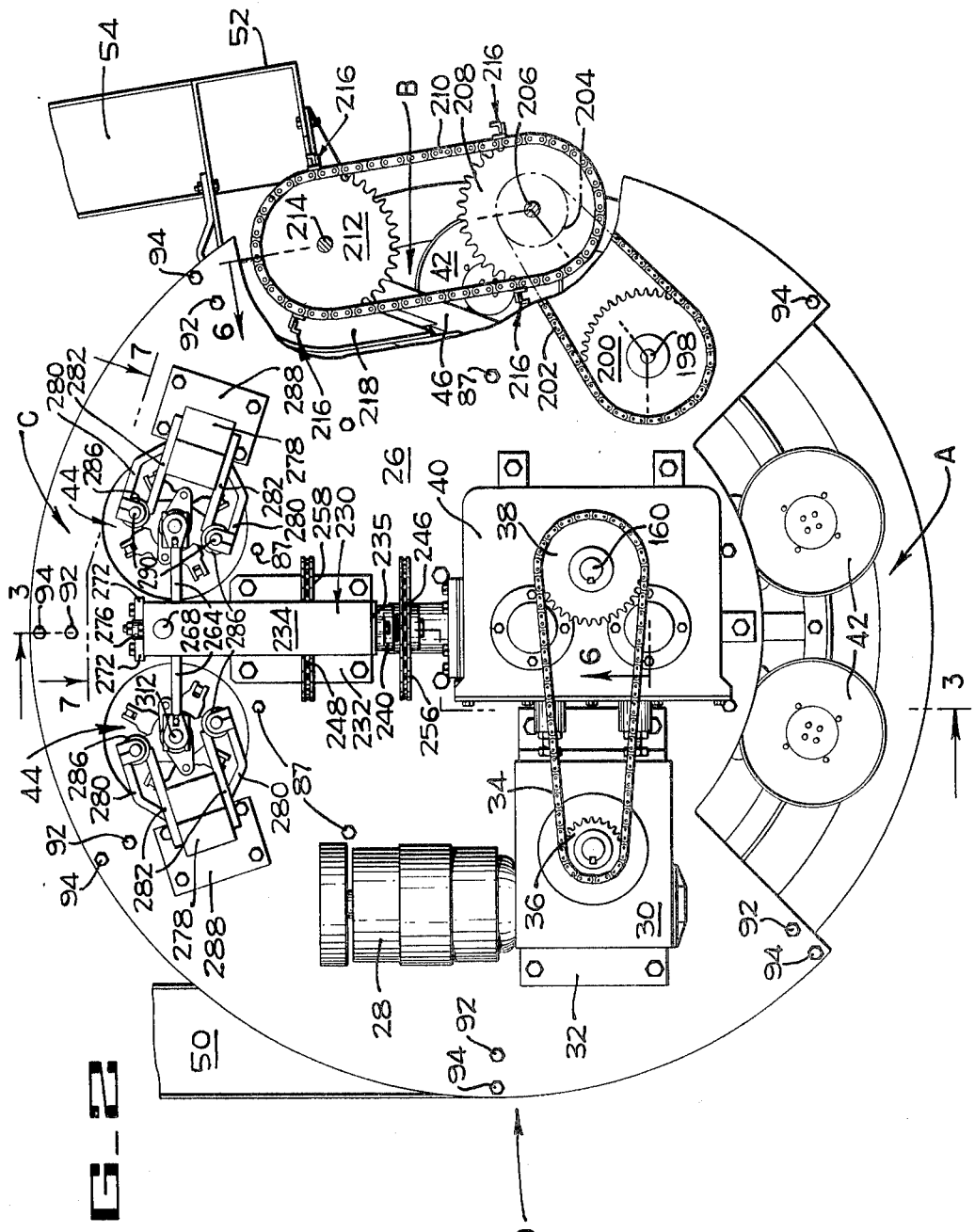

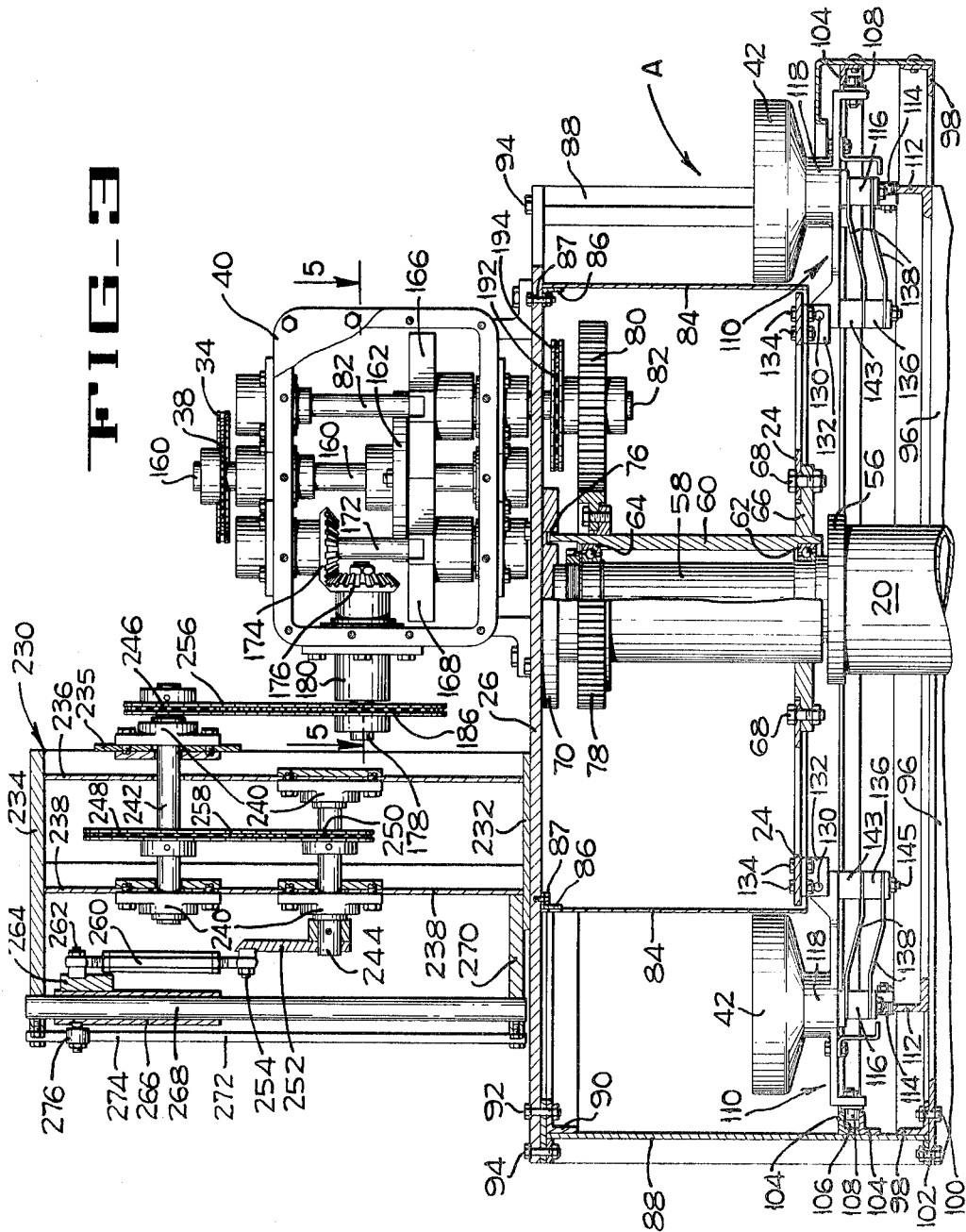

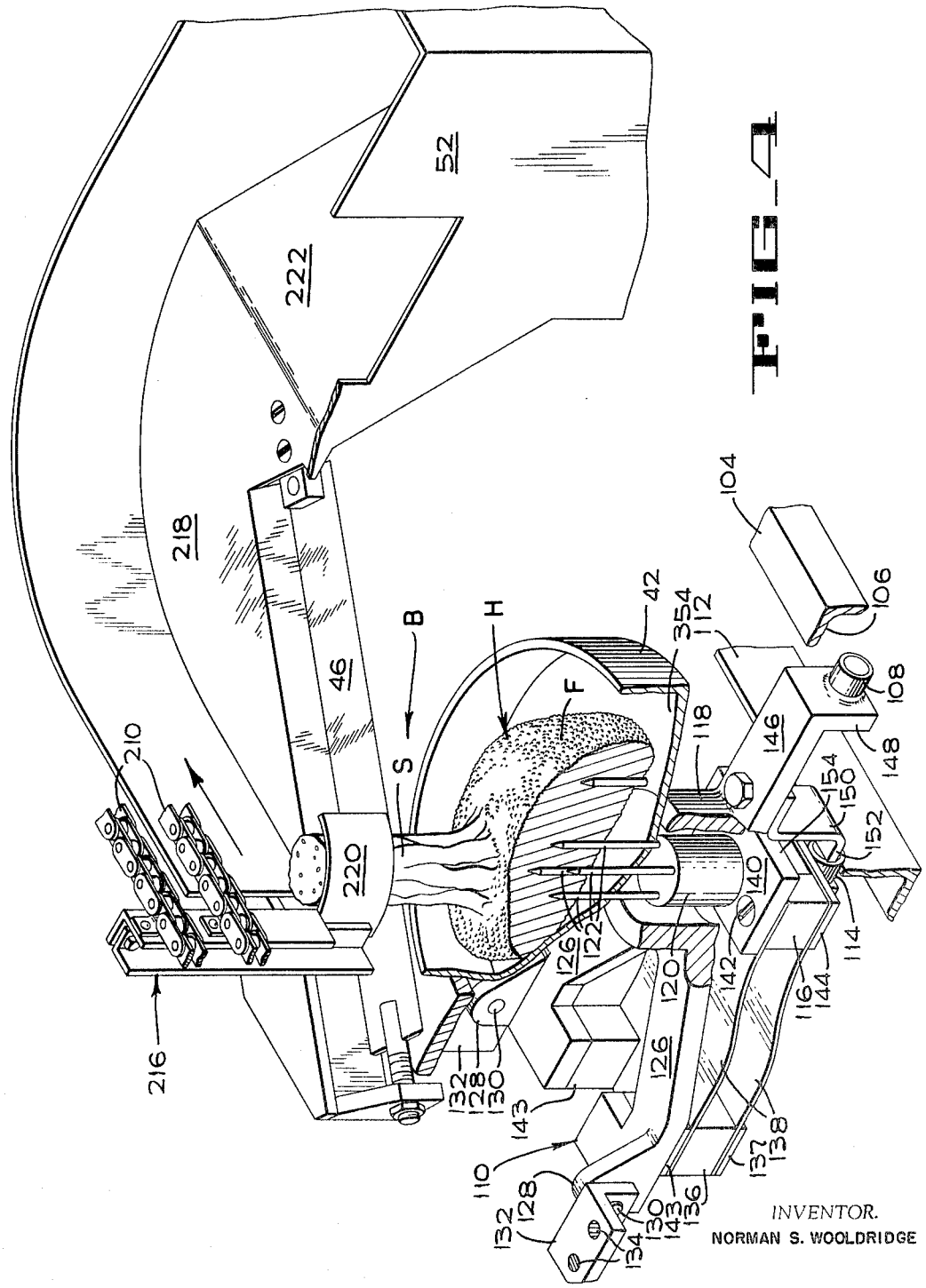

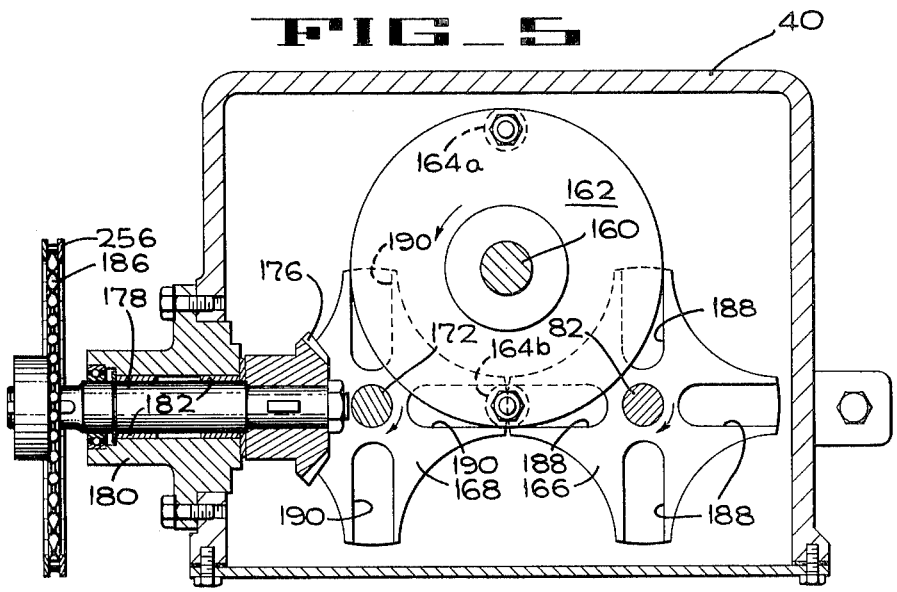
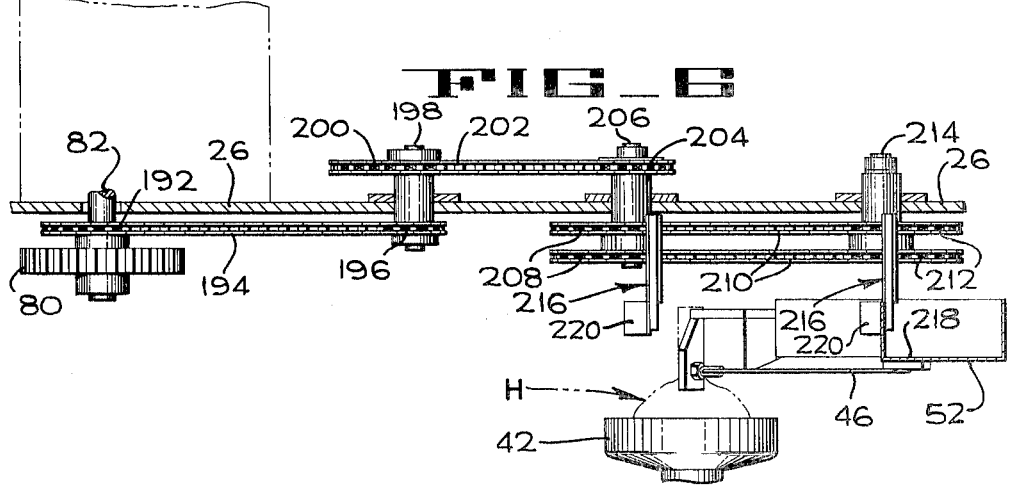

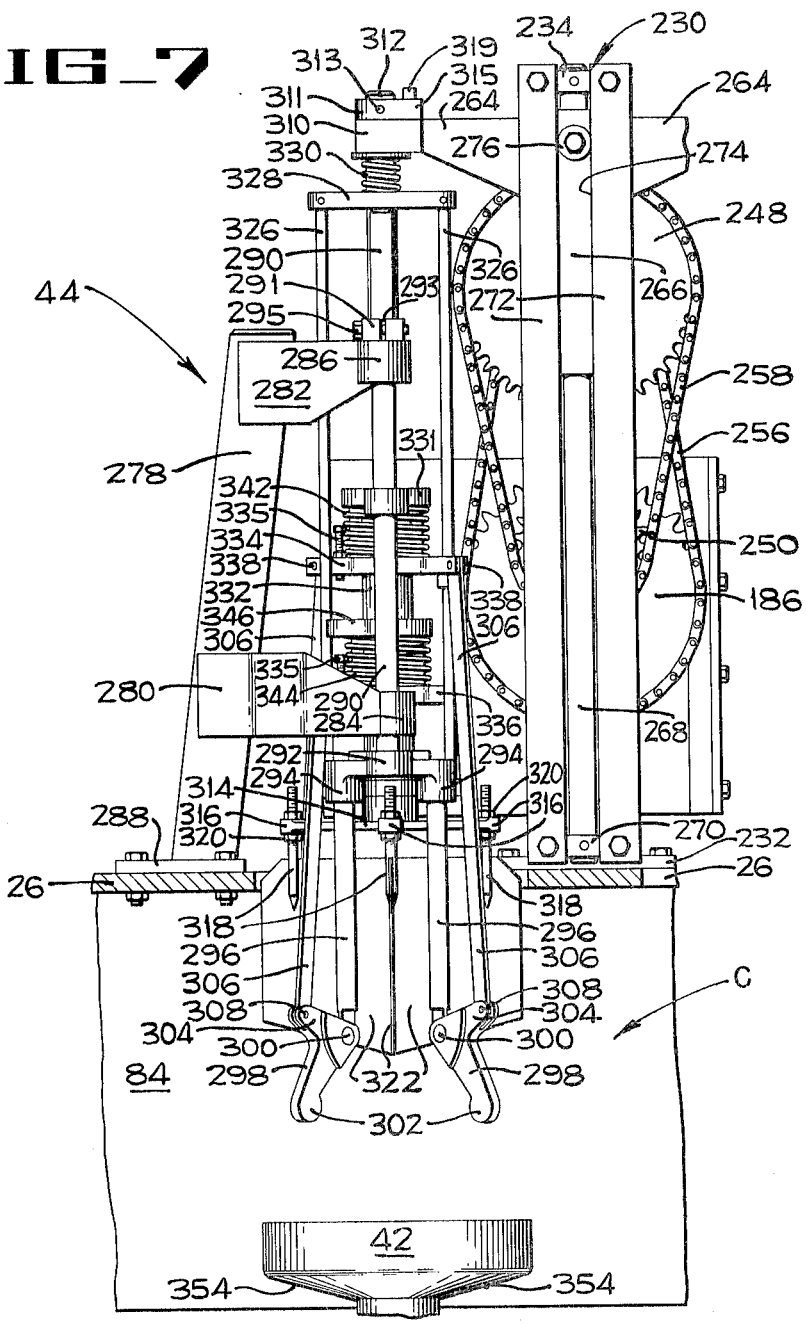

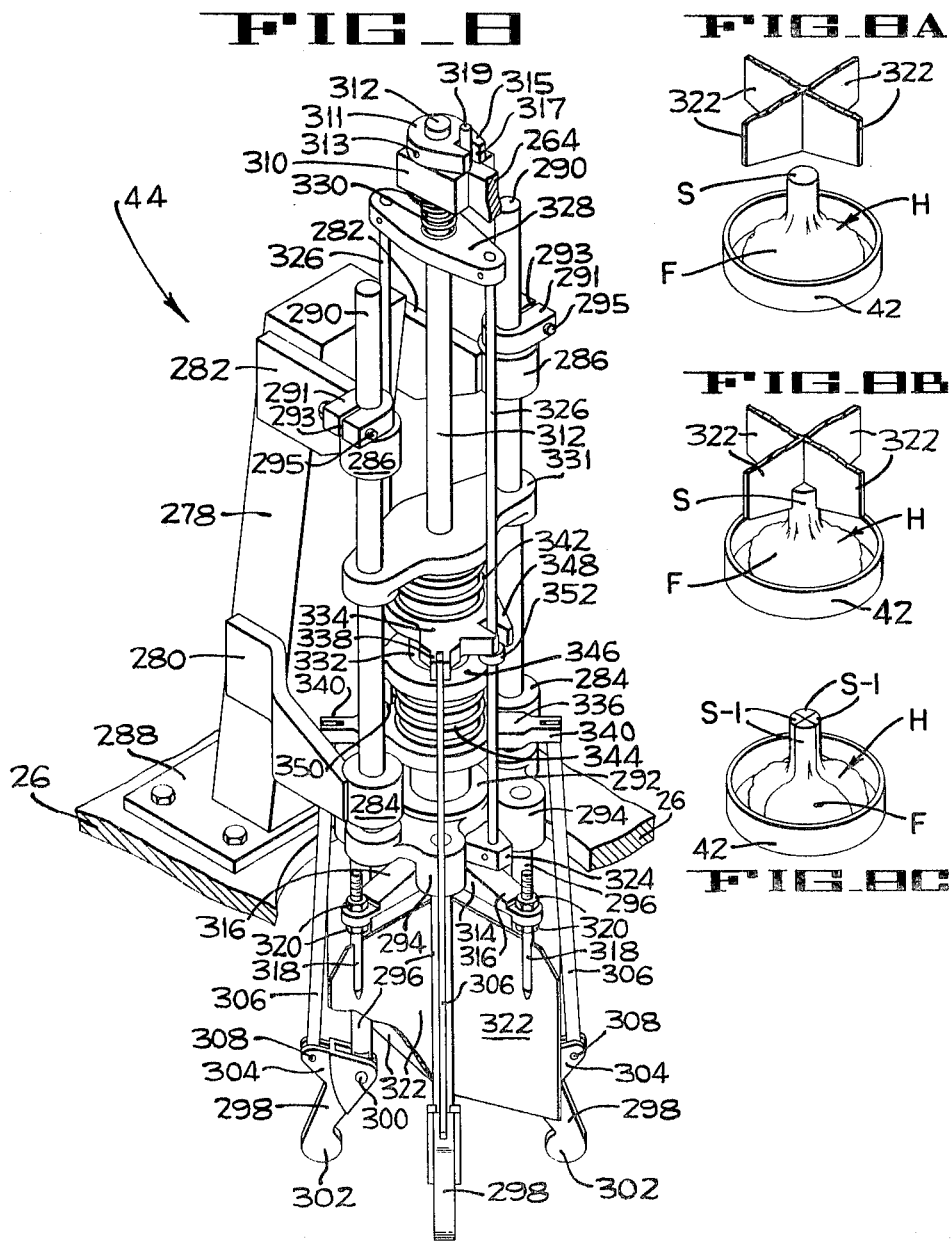

United States Patent Office 3,252,491
Patented May 24, 1966

3,252,491
PRODUCE PROCESSING APPARATUS
Norman S. Wooldridge, Saratoga, Calif., assignor to FMC Corporation, San Jose, Calif., a corporation of Delaware
Filed Oct. 29, 1963, Ser. No. 319,832
11 Claims. (Cl. 146—78)

This invention relates to an apparatus for processing produce, such as broccoli, and more particularly to an apparatus that trims the stalks of broccoli to a desired length, sections each broccoli into spears, and discharges the spears from the machine for further processing.

Merchandising of perishable produce, such as broccoli, has evolved to the stage where accurately sized pieces, of a high degree of cleanliness, are required for packaging into specifically designed containers. The volume of such food products that are consumed have increased substantially thus dictating a greatly increased rate of packaging. Since produce reaches a desired degree of maturity during certain times of the growing season and since ever-increasing quantities of produce are grown, hand trimming and sectioning cannot meet production demands. More importantly, per unit cost of such hand processing is greater and does not attain the limits of accuracy possible with machine operation.

In the case of broccoli, for example, it has been the practice in the past for a laborer to cut or trim off the lower end of each broccoli stalk and then to cut the remaining stalk and flowered head into several spears of uniform size and shape, each spear including a stalk portion, or stem, and a small head. Exacting standards, as to length and weight of each spear, are set by governmental bodies, grocery chains and other groups. Therefore, any machine for trimming and sectioning broccoli must produce spears which meet such exacting standards, or else the advantages of speed and economy will be of little significance to the industry. The apparatus of the present invention does have the advantages of speed, economy and accuracy.

It is therefore an object of this invention to provide produce processing apparatus.

Another object is to section produce such as broccoli into equal parts.

Another object is to cut the stalks of broccoli and like produce to a predetermined length.

Another object is to section the stalk and the head of broccoli and like produce into spears.

Another object is to support produce such as broccoli in a device which is effective to retain each broccoli in a predetermined orientation while cutting and sectioning the same with such device being adapted to discharge the sectioned pieces of broccoli therefrom.

These and other objects of this invention will become more apparent when taken in conjunction with the following drawings, in which:

FIGURE 1 is a perspective of a broccoli processing apparatus embodying the subject invention.

FIGURE 2 is a top plan of the apparatus shown in FIGURE 1.

FIGURE 3 is a section taken substantially along the line 3—3 of FIGURE 2 with the transmission cover broken away and with the supporting shaft being partially sectioned.

FIGURE 4 is an enlarged perspective of the broccoli supporting pan and the stalk cutting blade.

FIGURE 5 is a section taken substantially along the line 5—5 of FIGURE 3 illustrating the indexing mechanism incorporated with this invention.

FIGURE 6 is a revolved section of the drive for the stalk supporting bars taken substantially along the line 6—6 of FIGURE 2.

FIGURE 7 is an enlarged side elevation of one of the sectioning heads incorporated in this invention when viewed in the direction of the reference plane 7—7 of FIGURE 2.

FIGURE 8 is an enlarged perspective of one of the sectioning heads showing more of the constructional details.

FIGURES 8A, B and C are operational diagrammatics illustrating the sectioning of a broccoli head.

A broccoli processing apparatus embodying the present invention is illustrated in FIGURES 1, 2 and 3 as comprising a vertically upwardly extending tubular support 20 having radially extending circumferentially spaced legs 22 together supporting vertically spaced generally circular plates 24 and 26. A conventional electric motor 28 is connected to a speed reducer 30 fixed to a base member 32 which in turn is fixed to the upper surface of the plate 26. A roller chain 34 transmits power from a sprocket 36, secured to the output shaft from the speed reducer 30, to a sprocket 38 fixed to the input shaft of a transmission 40, which is also secured to the upper surface of the plate 26.

As shown in FIG. 2, the apparatus includes four circumferentially spaced processing stations; namely, a loading station A, a stalk trimming station B, a sectioning station C, and a discharge station D. A plurality of broccoli supporting pans 42 are pivotally connected in circumferentially spaced relation to the plate 24. As will hereinafter be particularly described, the plate 24 is mounted for rotatable movement relative to the vertical support 20 thereby carrying the broccoli supporting pans 42 in a closed circular path through each of the processing stations. The plate is driven so that each adjacent pair of pans is indexed from station-to-station. That is, a pair of pans moves from station A to station B and stops there momentarily; then they move to and stop briefly at stations C and D and continue on to A. At the stalk cutting station B (FIGURE 4) a cutting blade 46, extending across and above the line of movement of the pans 42, cuts an upper portion of the stalk of each broccoli H as it passes through station B. The sectioning station C includes two sectioning heads 44 which are located above the line of movement of the pans 42 and are operative to lower associated groups of sectioning blades 322 in timed relation with the positioning of two adjacent pans thereunder, and to effect sectioning of the broccoli supported in the pans 42, indicated by the letter H in FIGURES 4, 8A, 8B and 8C.

Each broccoli H comprises a stalk portion S and a bulbous flowered head portion F. The broccoli H are positioned in the pans 42 with the stalk portions extending vertically. Lowering of the sectioning blades 322 divides the stalk portions S and the flowered portions F into spears S–1 as shown in FIGURE 8C. The discharge station D includes a formed cam track 48 that constrains each pan to be titled downwardly (FIGURE 1) thereby causing the sectioned broccoli processed at station C to be gravitationally discharged therefrom to a suitable conveyor 50, or a container, as desired.

In operation, the operator is seated at station A and positions a broccoli H, in each of the pans which are momentarily located at that station. Indexing of the plate 24 and the associated pans moves the pans with the broccoli disposed therein through the stalk cutting station B during which time the knife 46 cuts an uppermost portion of each stalk S to a desired height; the trimmed portions of the stalks are carried to a discharge chute 52 which communicates with a take-away conveyor 54. Indexing of the plate 24 another increment positions the broccoli that have had their stalks trimmed under the sectioning heads 44 which are actuated downwardly during the dwell period of the plate 24 to quarter these broccoli into spears S-1. Indexing of the plate 24 positions the pans 42 containing the quartered broccoli at the discharge station D where each pan is tilted into the position shown in the foreground in FIGURE 1 thereby permitting the quartered broccoli to fall onto the conveyor 50 (FIG. 2) where each spear S-1 is transported to subsequent processing apparatus, for example, to a washing machine, not shown.

Referring now to FIGURE 3, the manner in which the plate 24 is rotatably mounted on the tubular support 20 is shown. A circular plate 56 is fixed to the upper end of the tubular support 20 and has mounted thereon an upwardly extending coaxial shaft 58. A tubular shaft 60, surrounding and coaxial with the shaft 58, is rotatably mounted with respect thereto by bearings 62 and 64, and a flange 66 is welded to the lower outer peripheral surface of the shaft 60. The flange 66 in turn is rigidly connected to the plate 24 by bolts 68. The upper end of the shaft 58 is connected to the plate 26 by a flange 70. The flange 70 has an annular clearance groove 76 within which is located the upper end of the shaft 60 and which defines a seal that precludes entrance of foreign matter to the interior of the shaft 60. A ring gear 78, fixed to the shaft 60, is in meshing engagement with a gear 80 that is mounted on an output shaft 82 of the transmission 40. In this manner, rotation of the gear 80 transmits rotation to the gear 78, to the tubular shaft, and to the plate 24.

A circular skirt 84 extending from the lower surface of the upper plate 26 to and in close adjacency with the margin of the plate 24 encloses the drive for the tubular shaft 60. The upper end of the skirt 84 is secured to the plate 26 by angular brackets 86 that are rigidly connected to the skirt 84 and to the lower surface of the plate 26 by the bolts 87. An arcuate horizontal angle iron 90 is bolted, by bolts 92, radially inwardly and on the lower surface of the upper plate 26. Vertical struts 88 are located against the downwardly extending leg of the angle iron 90 and the lower surface of the plate 26 and held in this position by the bolts 94. A plurality of generally triangularly-shaped gussets 96 are welded to the tubular support 20 below the circular plate 56 and extend radially outwardly therefrom, terminating at the lower end of the vertical struts 88. Another angle iron 98, having a shape similar to the angle iron 90, interconnects and is fixed to each of the triangular gussets 96 by the bolts 100. The lower ends of the vertical struts 88 are secured to the gussets 96 by the bolts 102. A curved angle iron 104 extending from station A to station D as viewed in FIGURE 2 is secured to the inner surface of the vertical struts 88. At station D a short piece of angle iron 104a which is also secured to the struts 88 forms a short curved track 106. A pan supporting bracket 110 is attached to each pan 42, and a lateral roller 108, riding in the track, is journaled on each bracket. An arcuate, angle-iron inner track 112, which has one leg thereof fixed to the gussets 96, is located radially inwardly from the curved angle 104 and also extends from station A to station D. Blocks 116 are mounted under each pan, and a lower roller 114 riding on the inner track, is journaled beneath each pair of blocks 116. The inner track and the angle-iron 104 constrains the pans 42 to move in a substantially horizontal arcuate path from station A to but not including station D.

As shown in FIGURE 4, each of the pan supporting brackets 110 is generally Y-shaped and includes a tubular boss 118 centrally located under and secured to its respective pan 42. A cylindrical block 120 projects upward into the boss, and upwardly extending sharpened pins 122 are mounted on the block and extend through clearance holes formed in the pan 42. The diverging legs 126 of the bracket 110 have upwardly extending integral lug portions 128 that are pivotally connected by pins 130 to brackets 132 which are secured to the lower surface of the plate 24 by bolts 134 (FIG. 3). The opposite upper and lower surfaces of the blocks 116 and the upper and lower surfaces of blocks 136 have leaf springs 138 fixed thereto in any suitable manner. The cylindrical block 120 has the lower end thereof fixed to a rectangular block 140 which is secured to the blocks 116 by bolts 142 (only one of which is shown). The bolts 142 (FIG. 4) extend through aligned openings formed in each of the leaf springs 138 and through the blocks 116 and are threadedly engaged in corresponding holes formed in a block 144 upon which is mounted the lower roller 114. In the same manner, bolts 145 are extended upward through a lower block 137, the springs 138, the blocks 136 and blocks 143 and are threaded into the diverging legs 126. The remaining leg 146 of each bracket 110 terminates in a downwardly bent portion 148 which rotatably supports its associated lateral roller 108. Secured to the lower surface of the leg 146 and inwardly from the bent portion 148, a Z-shaped bracket 150 is provided. Each Z-shaped bracket has a stop portion 152 extending under an over-hanging portion 154 of the rectangular block 140 for engagement thereby in order to limit retraction of the pins 122.

As shown in FIGURE 1, the cam track 48 comprises a pair of parallel rods or strips 156 which are interconnected at longitudinally spaced points by U-shaped bridging members 158 being effective to retain the spacing between the rods or strips 156 and provide clearance for the rollers 108 which pass between the rods 156. The cam track interconnects opposite ends of the outer track 106 and provides a downward and inward dip in the path of travel of the lateral rollers 108 as they move through station D. It should be noted that the inner track 112 terminates at the triangular gusset 96a and originates at the triangular gusset 96b identified in FIGURE 1. Therefore, at the discharge station D, the roller 114 is not provided with any surface or edge upon which rolling engagement is established.

Considering the form of the cam track 48 from the gusset 96a to the gusset 96b, it will be noted that the cam track is formed with a steep downward portion which merges into a lower dwell portion which in turn merges with an upwardly gently curving portion, the latter being connected to the angle irons 104 and 104a at the triangular gusset 96b.

In a sense, the cam track may be likened to a portion of a roller-coaster track. When the plate 24 indexes, thereby moving a pan 42 into station D, the roller 114 becomes disengaged from the upper end of the inner track 112, permitting the leaf springs 138 to assume a substantially non-deflected position which moves the block 120 and the associated pins 122 downwardly relative to the pan 42; such downward movement is limited by engagement of the over-hanging portion 154 with the stop portion 152. At substantially the same time, the roller 108 leaves the outer track 106 and rides on the cam track 48 thereby effecting pivotal movement of the entire bracket 110 about the pivot pins 130 which causes consequent tipping of each pan 42 in the manner shown in FIGURE 1. During this tipping, the broccoli spears S-1 drop out of the pan 42 onto the product conveyor 50 (FIG. 2). As each pan is indexed toward station A, the upwardly curving portion of the cam track guides the roller 108 into rolling engagement with the angle iron 104 and the roller 114 again engages the curved track 112, deflecting the leaf springs 138 upwardly into resiliently stressed condition and causing the pins 122 to project upwardly relative to the inner surface of the pan 42.

As shown in FIGURES 3 and 5, the transmission 40 includes an input shaft 160 to which is keyed the sprocket 38 about which the roller chain 34 is trained to thereby transmit power from the sprocket 36 which is secured to the output shaft of the speed reducer 30. A driving wheel 162 including diametrically opposed rollers 164a and 164b is secured to the shaft 160. A pair of Geneva wheels 166 and 168 are fixed, respectively, on shafts 82 and 172 which are journalled for rotation in the upper and lower opposite walls of the transmission 40. As shown in FIGURE 3, a bevel gear 174, in meshing engagement with a bevel gear 176, is fixed on the shaft 172. A bearing housing 180, within which are fixed bearings 182, rotatably supports a shaft 178 mounting the bevel gear 176. The end of the shaft 178 projecting outwardly from the transmission 40 has a sprocket 186 fixed thereon. Each of the Geneva wheels 166 and 168 includes four diametrically opposed equally circumferentially spaced slots 188 and 190, respectively, which are of sufficient size to slidably receive the rollers 164a and 164b on the driving wheel 162. The wheels 166 and 168 are coplanar and are preferably below the driving wheel 162 so that rotation of the driving wheel 162, in the direction indicated by the arrow in FIGURE 5, causes the rollers 164a and 164b to be slidably received in the slots 190 and 188.

In operation, rotation of the driving wheel 162 causes sequential indexing of the shafts 82 and 172 in clockwise directions indicated by the arrows on the Geneva wheels 166 and 168 in FIG. 5. Let it be assumed that the driving wheel is rotating continuously and the instantaneous positions of the parts are as shown in FIGURE 5; during the next 90° of rotation of the driving wheel 162, the roller 164a establishes contact with the Geneva wheel 168 in the slot 190 which at this time faces and is tangent to the roller 164a, and the roller 164b is moved into the aligned slot 188. The Geneva wheel 166 and the associated shaft 82 are caused to rotate in the direction indicated by the arrow on the wheel 166 through an arc of 90°. For the next 90° of rotation of the driving wheel 162, the Geneva wheel 168 is rotated in the direction indicated by the arrow on the wheel 168 through an arc of 90° while the Geneva wheel 166 remains at rest. Therefore it is seen that the disclosed transmission is operative to effect alternate movement of the shafts 172 and 82 in increments of 90° during each movement.

Rotation of the shaft 172 (FIG. 3) is transmitted by the bevel gear 174 to the bevel gear 176 which in turn rotates the shaft 178 and the sprocket 186. The intermittent rotation of the shaft 82 is transferred by means of the gears 80 and 78 to the tubular shaft 60 and to the plate 24 which pivotally supports the circumferentially spaced pans 42.

A sprocket 192 is mounted on the shaft 82 between the gear 80 and the lower surface of the upper plate 26, as shown in FIGURES 3 and 6. A sprocket chain 194 is trained about the sprocket 192 and another sprocket 196 (FIGURE 6) which is fixed to a vertical shaft 198 rotatably mounted on the upper plate 26. The portion of the shaft 198 extending above the plate 26 has a sprocket 200 fixed thereto with which is meshingly engaged another sprocket chain 202 which is trained about a sprocket 204 fixed to a shaft 206 also rotatably mounted in the plate 26. The shaft 206 extends through and below the plate 26 and has a pair of adjacent sprockets 208 secured thereto with each of these sprockets interconnected by sprocket chains 210 to another pair of sprockets 212 fixed to a shaft 214 rotatably mounted in the plate 26.

With reference to the cutting station B, four equally spaced vertical bars 216 (FIGS. 2 and 4) are secured so the lateral outward margins of each chain 210, extend downwardly from the lowermost chain 210, and terminate above a plate 218 which forms part of the discharge chute 52. Arcuate pusher plates 220 are fixed to the lower ends of the vertical bars 216 and extend laterally relative thereto. The vertical bars and each associated pusher 220 travel in the orbit defined by each sprocket chain 210 and are related with the indexing movements of the lower plate 24 and the associated pans 42 so that the pusher plates 220 successively engage (FIG. 4) the portions of the broccoli stalks extending above the knife 46 and the plate 218, thereby supporting the broccoli as it traverses the cutting knife 46 to effect severance of the upper portions of the broccoli stalks extending above the knife 46. Each severed portion of broccoli stalk is urged by one of the arcuate plates 220 along the plate 218 to a downwardly inclined bent portion 222 of the discharge chute 52 which directs the severed portion of each stalk downwardly to the take-away conveyor 54.

Since the lower plate 24, supporting each of the pans 42, and the chains 210, supporting the vertical bars 216 and the associated pusher plates 220 are arranged to be driven from the output shaft 82, timed simultaneous intermittent movement of the pans 42 and the pusher plates 220 is effected. As shown in FIGURE 4, a broccoli head is impaled on the pins 122 with the stalk extending upwardly. The reach of the chains 210, located inwardly from the lateral margin of the upper plate 26, follows a path which, as shown in FIG. 2, extends lengthwise of the path of the pans 42 where the paths of the pusher plates and pans cross respectively above and below the knife 46. Thus the orbits described by the sprocket chains 210 and the pans 42, and their simultaneous movement, cooperate to effect severing that portion of the stalk of each broccoli which extends above the cutting plane of the knife 46.

The particular mode of operation at the stalk cutting station B is as follows. When two pans are momentarily brought to rest at the loading station A (FIG. 2), the operator positions a broccoli H in each pan 42 with the stalk S extending upwardly, as shown in FIGURE 4. Subsequent indexing of the plate 24, and concomitant orbital movement of the chains 210, successively positions each of the pans 42 adjacent the cutting blade 46 as shown in FIGURE 4. Movement of the chains 210 and the associated pusher plates 220 is so timed that before the stalk of each broccoli H becomes engaged with the cutting edge of the blade 46, one of the pusher plates 220 engages the upper portion of the stalk extending above the cutting plane of the cutting blade 46 and moves in the same direction and at the same speed as the stalk. In this manner when the stalk S engages the cutting blade 46, the pusher plate 220 precludes rearward tipping of the broccoli when its stalk contacts the knife 46 by providing rearward support to the stalk as it is being cut. The removed upper portion of the stalk is carried by the pusher 220 onto the plate 218 and thence to the inclined portion 222 where it drops downwardly onto the conveyor 54.

The sectioning heads 44, illustrated in FIGURES 7 and 8, are operated in timed relation with the indexing movements of the lower plate 24 in such a manner that the heads 44 are in their retracted positions, as shown in FIGURE 7, during the time when the plate is moving the pans 42 between the adjacent processing stations A, B, C and D. During the dwell periods of the plate 24, adjacent pans 42 are individually located below and in vertical alignment with the heads 44. At this time, each head is actuated downwardly toward the pans 42 effecting sectioning of each broccoli carried by each of the adjacent pans. Thereafter, the sectioning heads are retracted into the position shown in FIGURE 7 and the plate 24 indexes the pans 42 containing the sectioned broccoli to the discharge station D.

The drive for each of the sectioning heads 44 (FIGURE 3) includes a support structure 230 mounted on a plate 232, which is secured to the upper surface of the plate 26, and an upper plate 234. These plates 232 and 234 are interconnected by transversely spaced vertical walls 235, 236 and 238 each of which carries bearings 240 in which are rotatably disposed vertically spaced parallel shafts 242 and 244. The shaft 242 has two sprockets 246 and 248 fixed thereon with the sprocket 246 being coplanar with the sprocket 186 which is mounted on the output shaft 178 of the transmission 40. The shaft 244 also has a sprocket 250 mounted thereon and positioned coplanar with the sprocket 248 on the shaft 242. The end of the shaft 244 extending to the left of the vertical plate 238 has a radially extending arm 252 fixed thereon with the arm carrying a crank pin 254 at the outer terminal end thereof. Sprocket chains 256 and 258 are respectively trained about the sprockets 186, 246 and 248, 250 to thereby establish a driving connection between the shafts 178 and 244.

A connecting link 260, in the form of a turnbuckle so that its length may be adjusted, is freely mounted on the crank pin 254 and to a pin 262 which is secured to a cross head 264. A slider block 266 carrying the cross head 264 is slidably mounted on a cylindrical rod 268 that extends between, and is connected to, the plates 234 and 270. Elongated guide bars 272 (FIGS. 3 and 7) are bolted to the edges of the plates 234 and 270 in such a manner as to define a vertical guideway 274 within which a roller 276, rotatably mounted on the slider block 266, is slidably movable. With such an organization of parts, rotation of the shaft 244 causes rotation of the radially extending arm 252 which is operative, by means of the connecting link 260, to impart reciprocation to the slider block 266 on the cylindrical rod 268.

Referring now to FIGURES 7 and 8, there is shown one of the identical sectioning heads 44. It is supported in the manner shown relative to plate 26 by an upwardly extending standard 278 which includes laterally extending vertically spaced pairs of arms 280 and 282 which include, respectively, lower and upper vertically aligned tubular bosses 284 and 286. The lower end of the standard 278 is mounted on a plate 288 which in turn is fixed to the upper plate 26. Support rods 290 are releasably mounted within the tubular bosses 286 and 284 and have secured to the lower ends thereof a formed plate 292. Collars 291, each of which is provided with a slot 293, are slidably fitted on the rods 290. The collars are located in abutting engagement with the upper surface of each boss 286 and are held in this position by bolts 295 which when tightened squeeze each collar on the rods 290 thus holding the rods 290 stationary relative to the standard 278. If it is desired to change the stroke of the sectioning heads 44 it is merely necessary to loosen the collars 291 and slide the rods 290 upwardly or downwardly to effect respectively an increase or decrease in stroke. The plate 292 has four equally spaced bored bosses 294 (only two of which are shown in FIGURES 7 and 8) and fixed therein are downwardly extending rods 296 which have fingers 298, having the illustrated shape, pivotally connected to the lower ends thereof by pivot pins 300. Each finger 298 includes a lower convex portion 302 and an upper lateral lug 304 which is slotted so that its operating rod 306 is received within the slot and pivotally connected thereto by a pivot pin 308.

Each end of the cross head 264 (FIG. 2) is bifurcated to thereby define a yoke 310 (FIGS. 7 and 8) within which is located an elongate rod 312 whose lower terminal end is fixed in a spider 314 that includes four radially extending diametrically related support arms 316. The yoke 310 is retained against upward movement relative to the rod 312 by a collar 311 which is secured to the rod 312 by a pin 313. As shown the collar is formed with a radially enlarged portion 315 which is slotted at 317 to freely receive a pin 319. Each of the outboard ends of the arms 316 mounts an upright threaded stud 318. Lock nuts 320 are threaded on each stud 318 and engage opposite sides of each arm 316 as shown. The downwardly extending portion of each stud 318 is slotted and sectioning blades 322 are fixed in the slots of the studs 318. There are four sectioning blades 322 provided with the illustrated sectioning head 44, and each blade has a vertical inner edge adjacent to the extended axis of the rod 312. These inner edges are joined to each other in any suitable manner but preferably by welding. It is, of course, understood that the number of blades may be varied, two-blade and four-blade heads being most commonly employed for broccoli. Upwardly adjacent to the spider 314 and pinned to the rod 312 is a bracket 324 which includes diametrically opposite holes for receiving the lower ends of operating rods 326. The upper ends of the rods 326 are fixed in bores formed in another bracket 328 which is adjustably attached on the rod 312. A conventional compression spring 330, disposed on the rod 312, is located between the bracket 328 and the lower end of the yoke 310. The associated slot and pin, respectively 317 and 319, are operative to prevent rotation of the rod 312 relative to the crosshead 264 in the event the spring 330 is compressed to its maximum extent.

Another bracket 331 is adjustably secured to the guide rods 290 and is slidably disposed on the elongate rod 312. A tubular member 332 has an upper end secured to the bracket 331, in concentric slidable relation to the elongate rod 312, and the lower end fixed in the formed plate 292. Vertically spaced upper and lower yokes, respectively, 334 and 336, are slidably mounted on the tubular member 332 and include radially extending slotted ears 338 and 340 within which are pivotally connected the upper ends of the operating rods 306. Each yoke 334 and 336 is constantly urged downwardly by springs 342 and 344 respectively surrounding the tubular member 332 in the illustrated manner. The upper spring 342 is maintained in compression by the bracket 331 and the yoke 334, and the lower spring 344 is held in compression by a collar 346, rigid with the tubular member 332, and the lower yoke 336. Each of the yokes 334 and 336 includes radially enlarged slotted portions 348 and 350, respectively, within which the operating rods 326 are located. Stop collars 352 (only one of which is shown) are fixed on each of the operating rods 326 and are operable to move each of the yokes 334 and 336 upwardly on the tubular member 332 thereby compressing each of the springs 342 and 344 when the sectioning head 44 is in its raised position. It is to be noted that movement of the upper and lower yokes 334 and 336 upwardly also carries the operating rods 306 upwardly thereby effecting pivotal movement of the fingers 298 about the respective pivot pins 300 and moving the convex portion 302 on each finger 298 radially outwardly relative to the axis of the sectioning head. Adjustable stops 335, comprising a bolt and a lock nut are threadedly mounted on each yoke 334 and 336 with the stem of each bolt extending beyond the lower surface of each yoke. The stem of the stop 335 associated with the yoke 334, becomes engaged with the upper surface of the collar 346 thereby arresting further downward movement of the yoke 334 and consequently determining the extent to which the corresponding fingers are pivoted radially inwardly. In a similar manner engagement of the stem of the stop 335 associated with the yoke 336 engages the upper surface of the plate 292 and thereby determines the extent of pivotal movement of the corresponding fingers 298. Thus the stops 335 are operative to adjust the force with which the broccoli stalks S are gripped.

When two pans 42 supporting broccoli H that have had their stalks cut at station B are individually positioned in alignment with the sectioning heads 44, the heads operate as follows. The drive train (FIG. 3) for the cross head 264 is actuated, moving the cross head 264 downwardly which, through the springs 330 and brackets 328, effects substantially simultaneous downward movement of the sectioning blades 322 since the spiders 314 supporting the blades 322 are pinned to the lower ends of the rods 312. As soon as the rods 326 commence their downward movement, the collars 352 become disengaged from the yokes 334 and 346, permitting the springs 342 and 344 to force the yokes 334 and 336, and the operating rods 306 downwardly effecting radially inward movement of the fingers 298 toward the upwardly extending stalks S of the broccoli until the convex portions 302 on each of the fingers 298 establish gripping contact with the stalks of adjacent broccoli. It should be noted that very little downward movement of the sectioning blades 322 takes place before the fingers 298 grip the broccoli stalk. Continued downward movement of the crosshead 264 moves the sectioning blades 322 and the associated spider 314 until the leading cutting edges of the sectioning blades 322 are closely adjacent the sloping walls 354 of the pans whereby sectioning of the broccoli head is completed. The upwardly extending impaling pins 122 are so located that they do not interfere with the operation of the sectioning blades 322. Upon completion of the cuts (FIGURE 8C) the crosshead 264 commence to move upwardly, carrying the spiders 314 and the associated blades 322 and the brackets 324 and 328 interconnected by the rods 326 upwardly. When the rods 326 have moved a sufficient distance upwardly to engage the associated collars 352 with the upper and lower yokes 334 and 336, the yokes are moved upwardly carrying the operating rods 306 therewith, effecting outward pivotal movement of the fingers 298 and compressing the springs 342 and 344. It is also to be noted that the fingers 298 are maintained in engagement with the broccoli stalks until after the sectioning blades 322 have been withdrawn. It is then that the collars 352 move the yokes 334 and 336 upwardly releasing the fingers 298 from the stalks. The transmission 40 then effects indexing of the pans 42 located under the sectioning heads 44 to the discharge station D.

Since the specific operation at each of the processing stations A, B, C and D has been particularly described with respect to the structure located at the stations, the hereinafter described operation will deal only with the overall sequence. The operator is preferably seated adjacent the loading station A and a supply of broccoli, grasps a broccoli in each hand, and impales a head on the sharpened pins 122 of each pan at station A with the stalks extending upwardly.

The transmission 40 indexes the plate 24, moving the pans to the stalk cutting station B where one of the pusher plates 220 engages the forwardmost stalk and, together with its pan, thrusts the stalk against the blade 46. A subsequent pusher plate engages the rearwardmost stalk and the cutting action is repeated. The removed stalk portions are directed to the discharge chute 52 and thence to the conveyor 54.

The plate 24 is again indexed carrying the pans, which have had their broccoli stalks trimmed, to the station C where the stalks are positioned in coaxial alignment with their superposed rods 312 of the sectioning heads 44. After the plate 24 comes to rest, the transmission 40 actuates the shaft 242 which, through the described linkages, moves the crosshead 264 downwardly whereupon the upwardly extending stalk of each broccoli is gripped by the respective fingers 298 and the sectioning blades 322, continue downwardly dividing each broccoli into four spears S–1. After completion of the sectioning, both of the sectioning heads 44 are moved upwardly by the crosshead 264 and the fingers 298 are pivoted outwardly releasing the stalk of each broccoli and thus permitting indexing of the pans 42 to the discharge station D where each pan is tipped by the cam track 48 and the associated roller 108, dropping the spears of broccoli onto the take-away conveyor 50.

Thus, it is seen that this invention provides structure which is operative to continuously and sequentially process broccoli whereby the stalk of each broccoli is cut to a predetermined length and subsequentially the broccoli is sectioned into a predetermined number of spears, each including a short stem and small head, which are automatically and continuously discharged from the machine for further processing.

It will be understood that modifications and variations of the embodiments of the invention disclosed herein may be made without departing from the scope of the invention.

Having thus described the invention, what is claimed as new and is desired to be protected by Letters Patent is:

1. A sectioning mechanism for use in processing produce which has an elongated stalk, said mechanism comprising a support, radially extending sectioning blades rectilinearly reciprocably mounted on said support, and means movable into engagement with the stalk for applying a radially directed component of force on the stalk so as to confine the stalk against lateral movement during sectioning thereof.

2. An apparatus for processing produce of the type which includes a stalk and a head comprising means supporting the produce with the stalk thereof extending upward from the head, means for moving said supporting means in a desired path, means extending across said path for cutting through the stalk so as to separate an upper portion thereof from the remainder of the stalk, means located upwardly adjacent said cutting means for continually supporting the upper portion of the stalk during cutting thereof and for removing the upper portion of the stalk after cutting thereof, and means for moving said last mentioned means in substantially parallel relation to said desired path during said cutting and thence transversely of said path.

3. An apparatus for sectioning produce, which has a stalk and a head, into a plurality of spears comprising cutting means for sectioning the produce into spears, means mounting said cutting means for movement into and out of engagement with the produce, stalk gripping finger means operated in response to movement of said cutting means for gripping the stalk of the produce radially inwardly of the head and for applying a radially inwardly directed component of force on the stalk during sectioning thereof by said cutting means, and means for releasing said finger means after the produce had been sectioned.

4. A sectioning mechanism for use in a produce processing apparatus, said mechanism comprising a support, radially extending sectioning blades rectilinearly reciprocably mounted on said support, and means movable in timed relation with the reciprocation of said blades for holding the stalk of the produce while it is being sectioned by said blades, said means including pivotally mounted fingers located between adjacent ones of said blades.

5. In a produce processing apparatus which includes a stalk cutting mechanism; said mechanism comprising means for supporting the produce so that the stalk thereof extends substantially vertically upward therefrom; retractable impaling pins in said supporting means; means for moving said supporting means in a predetermined path; a stationary cutting blade extending crosswise of and above said path to intersect the upwardly extending stalk of the produce and effect cutting thereof; a traveling support mounted for movement in a path spaced above and in vertical alignment with the predetermined path of said supporting means; and means for moving said traveling support at the same time, in the same direction, and at the same speed as said produce supporting means; said traveling support including a support bar secured to and depending from orbiting roller chains and an arcuate transversely extending pusher plate engageable with produce stalk at least during cutting of the stalk.

6. An apparatus for sectioning produce into a plurality of spears comprising cutting means for sectioning the produce into spears, means mounting said cutting means for engagement and disengagement with the produce finger means operated as a result of movement of said cutting means for substantially encircling the stalk of the produce radially inward of the head and between the end of the stalk and the head during sectioning thereof by said cutting means, and means responsive to the disengagement of said cutting means for releasing said finger means.

7. An apparatus for processing produce of the type having a head and a stalk wherein means are provided for successively cutting an upper portion of the stalk and sectioning the head and the remaining portion of the stalk respectively, the combination including means for supporting the produce, said supporting means including a produce head supporting surface, means for transferring said supporting means to said cutting and sectioning means, means pivotally mounting said supporting means on said transferring means, a spring biased reciprocable block in said supporting means carrying impaling pins for piercing the head of produce, a discontinuous member for holding said block and said pins in position to project above the produce head supporting surface of said supporting means and wherein said pins are partially retracted with respect to said surface by said spring biased block upon termination of said discontinuous member, and means located at the termination of said member for pivoting said supporting means downwardly to effect gravitational discharge of a sectioned item of produce.

8. Apparatus for processing produce comprising a loading station, a cutting station, a sectioning station and a discharge station, produce supporting and transferring means movable at said sectioning station for sectioning said produce, main drive means operable alternately to move said produce supporting and transferring means between said stations and to actuate said sectioning means while said produce supporting and transferring means is at rest at said sectioning station, and movable stalk supporting means at said cutting station, means for driving said stalk supporting means operable simultaneously with said main drive means when said main drive means is moving said produce supporting and transferring means between said stations.

9. An apparatus for sectioning produce into a plurality of spears comprising cutting means for sectioning the produce into spears, means mounting said cutting means for engagement and disengagement with the produce, stalk gripping finger means operated as a result of movement of said cutting means for gripping the stalk of the produce radially inward of the head during sectioning thereof by said cutting means, means responsive to the disengagement of said cutting means for releasing said finger means, said stalk gripping fingers each including a lower convex portion and an upper lateral lug having a slot therein, and said means for releasing said fingers including a yoke mounted for vertical reciprocation and an operating rod fastened to said yoke and said slotted lateral lug whereby upward movement of said yoke pivots said lower convex portion of each of said gripping fingers out of engagement with said stalk.

10. In an apparatus for processing produce of the type which is provided with a stalk, produce-support means movable in a substantially horizontal path past a cutting station and a sectioning station and including means for supporting the produce so that the stalk extends vertically upwardly, means at said cutting station for cutting an upper portion of the stalk of produce carried by said produce-support means, said cutting means including a horizontally disposed cutting blade mounted to engage the stalk above said produce-support means, and a stalk-supporting mechanism including pusher means movable along an orbital path which intersects, only at said cutting station, a vertical projection of the path traversed by said produce-support means whereby said pusher means moves into a position overlying said produce-support means to engage and provide support for the stalk as it is engaged by said cutting means and then moves away from the produce-support means to permit engagement of the produce by downwardly moving instruments at the sectioning station.

11. Apparatus for processing produce of the type having a stalk and a head, said apparatus comprising means defining a loading station, a cutting station, a sectioning station and a discharge station; produce-supporting means mounted for movement through said stations to successively locate the produce at said stations and including means for engaging the head of the produce and orienting the produce with its stalk projecting vertically upwardly; stalk-support means at said sectioning station movable into engagement with the stalk for applying a radially directed component of force to the stalk so as to confine the stalk against lateral movement; cutter means at said sectioning station movable vertically downwardly to successively sectionize the stalk and then the head of the produce as it is held by said stalk-support means; and main drive means operable to move said produce supporting means between said stations and to move said sectioning means downwardly to engage the produce while said produce supporting means is at rest at said sectioning station.

References Cited by the Examiner

UNITED STATES PATENTS

| | | | |
|---|---|---|---|
| 915,241 | 3/1910 | Hampel | 146—160 |
| 2,092,786 | 9/1937 | Taylor | 146—6 X |
| 2,437,637 | 3/1948 | Bridge | 146—40 |
| 2,738,819 | 3/1956 | De Back et al. | 146—81 X |
| 2,858,865 | 11/1958 | Fleming et al. | 146—91 |
| 3,078,891 | 2/1963 | Rianda | 146—78 |

ROBERT C. RIORDON, *Primary Examiner.*

J. SPENCER OVERHOLSER, *Examiner.*

WILLIE G. ABERCROMBIE, *Assistant Examiner.*